UNITED STATES PATENT OFFICE.

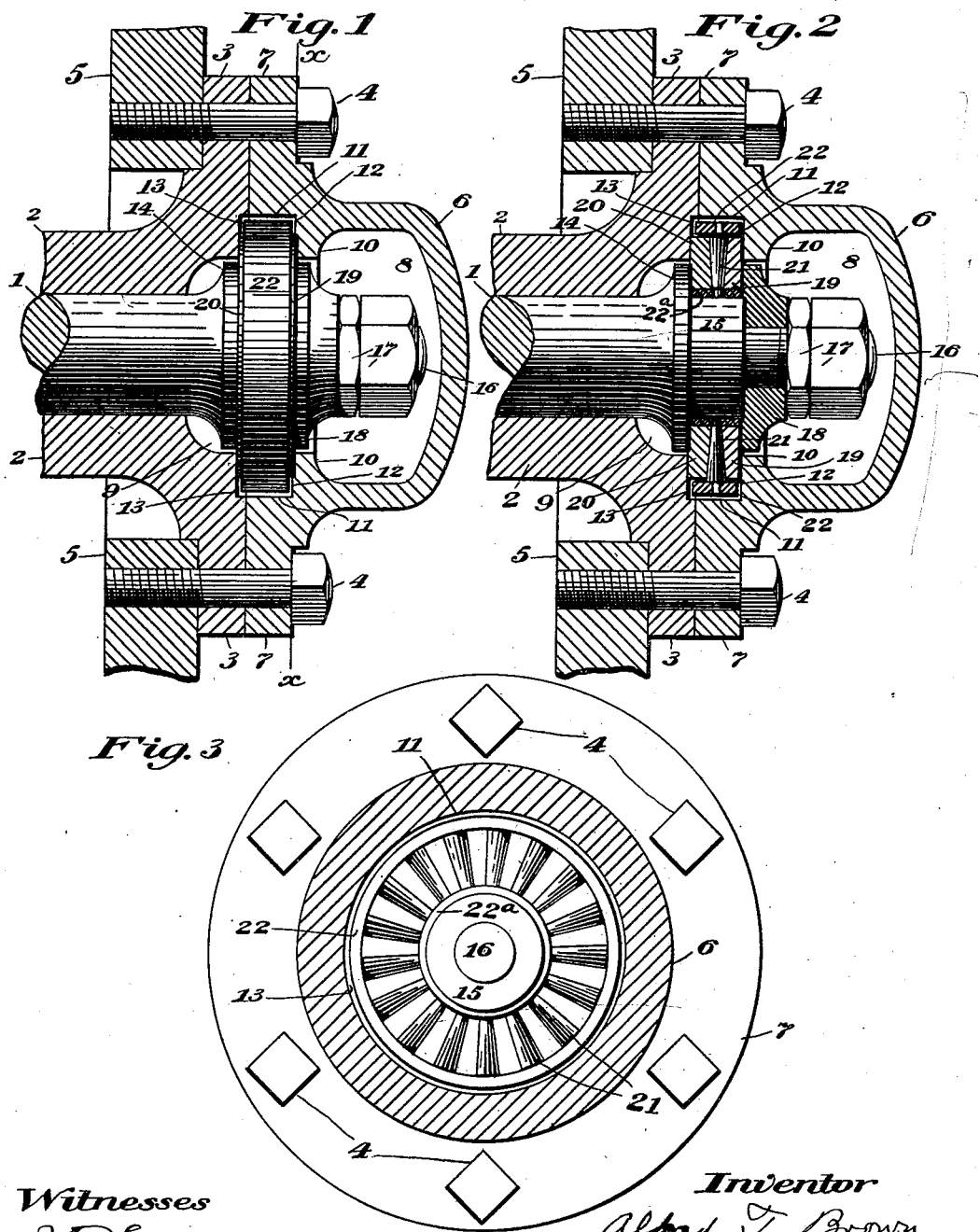

ALFRED T. BROWN, OF CINCINNATI, OHIO, ASSIGNOR TO THE WARNER ELEVATOR MANUFACTURING COMPANY, OF SAME PLACE.

THRUST-BEARING.

SPECIFICATION forming part of Letters Patent No. 673,676, dated May 7, 1901.

Application filed June 30, 1900. Serial No. 22,134. (No model.)

*To all whom it may concern:*

Be it known that I, ALFRED T. BROWN, a citizen of the United States of America, and a resident of Cincinnati, in the county of Hamilton and State of Ohio, have invented certain new and useful Improvements in Thrust-Bearings, of which the following is a specification.

This invention relates to certain improvements in thrust-bearings such as are especially adapted for use on shafts having reversible thrust, as elevator and steering worms and ship-propeller shafts; and the object of the invention is to provide an antifriction-bearing which shall be adapted to receive both of said thrusts, being designed to take the place of the two bearings commonly employed for this purpose.

The invention consists in certain novel features of the construction, combination, and arrangement of the several parts of the improved bearing whereby certain important advantages are attained and the device is made simpler, cheaper, and is otherwise better adapted and made more convenient for use, all as will be hereinafter fully set forth.

The novel features of the invention will be carefully defined in the claims.

In the accompanying drawings, which serve to illustrate the invention, Figure 1 is a sectional elevation taken axially through a bearing constructed according to my invention; and Fig. 2 is a view similar to Fig. 1, but showing certain of the internal parts of the bearing in section. Fig. 3 is a cross-section taken in the plane indicated by line $x$ $x$ in Fig. 1 and showing the arrangement of antifriction devices in the bearing.

Referring to the figures, 1 indicates a shaft having a casing inclosing its end portion. This casing, as herein shown, is formed in two parts—a housing 2 and a cap 6. The housing 2 is provided with a flange 3 at its outer end, said flange being secured, by means of bolts 4, to the frame 5 or other fixed part on which the bearing is mounted. The cap 6 is removably attached to the housing, being provided with a flange 7, which fits flush on the flange 3 of the housing and is secured thereto by means of the bolts 4. The cap 6 fits over the end of the shaft 1 and is designed for removal to permit access to the antifriction devices of the bearing, which are inclosed within the casing. The cap 6 of the casing is recessed or hollowed out on its inner side, as shown at 8, and the end of the housing 2 adjacent to said cap is similarly recessed, as shown at 9, the two recesses communicating with each other and surrounding the end portion of shaft 1 and being partially separated from each other by an annular inturned flange 10, produced in the recess 8 of cap 6. The flange 10 of the cap and the end surface of the housing 2 are separated by a space 11, the opposite walls of which form two outer bearing-surfaces 12 and 13, facing each other. In the space 11 is a bearing device which contacts with the respective walls or bearing-surfaces 12 and 13, as clearly shown in Figs. 1 and 2.

The shaft 1 has an enlargement 14 produced upon it and forming an annular shoulder having on its side an inner bearing-surface in substantial alinement with the outer bearing-surface 13, formed by one wall of the space 11 in the casing. The shaft 1 has a plain cylindrical portion 15 outside the collar 14, and beyond said plain portion 15 the shaft is made in reduced diameter and is screw-threaded, as shown at 16. The reduced and threaded portion 16 of the shaft extends within the recess or hollow 8 of the cap 6 and serves as a pin or stud on which is held a ring or collar 18 of substantially the same diameter as the collar 14. Said ring or collar 18, being larger than the shaft, also produces upon the shaft an annular shoulder the side of which forms an inner bearing-surface similar but opposite to the bearing-surface formed on the side of said collar 14 and in substantial alinement with the bearing-surface 12 in the space 11 of the casing. Nuts 17, screwed on the threaded end 16 of the shaft, serve to hold the removable collar 18 in place upon the shaft.

The bearing device above referred to is adapted for contact with the inner bearing-surfaces formed at the adjacent sides of the collars 14 and 18 on the shaft as well as with the outer bearing-surfaces 12 and 13 in the space 11 of the casing, and in its preferred form said device comprises two annular parts or bearing-rings 19 and 20, beveled on their adjacent sides to receive between them a series of tapered rollers 21, held in a cage formed of an outer band or annulus 22, arranged in the space 11 of the casing and encircling the bearing-rings, and an inner band or annulus 22ª, arranged within the bearing-rings 19 and 20 and between the said bearing-rings and the end portion 15 of the shaft.

In constructing and assembling the device a very slight degree of looseness or play is left between the bearing device and the respective inner and outer bearing-surfaces between which said device is held, so that the thrust of the shaft in one direction will act to bring one inner bearing-surface or shoulder on the shaft into contact with the side of the bearing device and to bring the other side of the bearing device into contact with the opposite outer bearing-surface or wall of the space 11 in the casing, the remaining inner and outer bearing-surfaces being simultaneously moved out of contact with the bearing device, so as to lessen the friction which would be otherwise produced. When the thrust of the shaft is in the other direction, the operation of the bearing will be the same, except that the bearing-surfaces which were before in contact with the bearing device will be placed out of contact with said device and those bearing-surfaces which were before out of contact with said device will be brought into engagement with the bearing device.

The improved bearing constructed according to my invention is of an extremely simple and inexpensive nature, since it is adapted to receive both thrusts of the shaft, for which purpose two independent bearings have hitherto been commonly employed. It will also be seen that the construction of the bearing is such as to lessen as much as possible the friction due to the thrust by moving the bearing device into and out of contact with the inner and outer bearing-surfaces and by permitting the parts of the bearing device to turn in contact with each other. The construction of the improved bearing is also such that there is no rubbing between the collars on the shaft or the walls of the space 11 in the casing and the bearing-rings, because they are of such materials as to adhere when pressed together, while the intervening antifriction parts of the bearing device are of such a nature as to produce but little friction between the rings themselves. There are no wearing parts except these bearing-rings and intervening antifriction parts, and these may be readily and cheaply replaced. The location of this double-thrust bearing at the end of the shaft gives a great advantage in accessibility for repairs, whereas in the usual constructions the removal of these bearings was attended with considerable trouble and expense. The oil-chamber also gives opportunity for the use of special lubricant and its frequent renewal. It will also be obvious from the above description that the improved thrust-bearing is capable of some modification without material departure from the principles and spirit of the invention, and for this reason I do not wish to be understood as limiting myself to the precise form and arrangement of the several parts herein set forth.

Having thus described my invention, what I claim, and desire to secure by Letters Patent, is—

1. In a thrust-bearing the combination of a shaft, parts held on the shaft and of greater diameter than the portion of the shaft between them and forming on their adjacent sides inner bearing-surfaces, a casing around the shaft and having a space the walls of which form outer bearing-surfaces, a plurality of bearing-rings encircling the shaft between and adapted for engagement with the inner and outer bearing-surfaces and antifriction parts interposed between said bearing-rings, substantially as set forth.

2. In a thrust-bearing the combination of a shaft, parts held on the shaft and of greater diameter than the portion of the shaft between them and forming on their adjacent sides inner bearing-surfaces, a casing around the shaft and having a space the walls of which form outer bearing-surfaces, and a bearing device held on the shaft between the inner and outer bearing-surfaces and capable of a limited extent of movement relatively to the casing and shaft in a direction parallel with the axis of the shaft and comprising bearing-rings arranged for contact with said inner and outer bearing-surfaces, and antifriction devices interposed between said bearing-rings, substantially as set forth.

3. In a thrust-bearing the combination of a shaft, a casing surrounding the shaft and formed with a space extended around the shaft, and a circular bearing device arranged to turn loosely around the shaft, means to limit the movement of said bearing device lengthwise along the shaft, said bearing device comprising circular bearing-rings and antifriction parts interposed between the bearing-rings, and said bearing-rings each being arranged with its periphery projecting into the space of the casing and adapted for engagement with the walls thereof, substantially as set forth.

4. In a thrust-bearing, the combination of a shaft, parts held on the shaft and of greater diameter than the portion of the shaft between them and forming on their adjacent sides inner bearing-surfaces, a bearing device loose upon the shaft between said inner bearing-surfaces, a housing around the shaft and a cap removably attached to the housing, the adjacent parts of said housing and cap being separated by a space the opposite walls of which form outer bearing-surfaces between which the peripheral portion of the bearing device is extended and with which the opposite sides of said bearing device are adapted for contact, substantially as set forth.

Signed by me at Cincinnati, Ohio, this 18th day of June, 1900.

ALFRED T. BROWN.

Witnesses:
JOHN ELIAS JONES,
J. D. THORNE.